United States Patent
Kumar

(10) Patent No.: US 8,791,362 B2
(45) Date of Patent: Jul. 29, 2014

(54) SHUTTER DOOR ASSEMBLY FOR AN ELECTRICAL PANEL

(75) Inventor: Anuraj Kumar, Bareilly (IN)

(73) Assignee: General Electric Company, Schenectady, NY (US)

( * ) Notice: Subject to any disclaimer, the term of this patent is extended or adjusted under 35 U.S.C. 154(b) by 70 days.

(21) Appl. No.: 13/479,699

(22) Filed: May 24, 2012

(65) Prior Publication Data
US 2013/0313016 A1 Nov. 28, 2013

(51) Int. Cl.
*H01H 9/02* (2006.01)

(52) U.S. Cl.
USPC .................................. 174/53; 361/616

(58) Field of Classification Search
USPC ............... 361/654, 672, 616; 174/53, 54
See application file for complete search history.

(56) References Cited

U.S. PATENT DOCUMENTS

| | | | | |
|---|---|---|---|---|
| 4,591,657 A | * | 5/1986 | Masters | 174/50 |
| 4,688,146 A | * | 8/1987 | Newmark et al. | 361/672 |
| 5,148,348 A | * | 9/1992 | White | 361/658 |
| 5,419,208 A | * | 5/1995 | Schick | 73/863.73 |
| 5,654,871 A | | 8/1997 | Wentler et al. | |
| 5,663,862 A | * | 9/1997 | Hopping-Mills | 361/115 |
| 5,783,775 A | * | 7/1998 | Marusinec | 174/50 |
| 6,038,125 A | * | 3/2000 | Anzai | 361/609 |
| 7,324,332 B1 | * | 1/2008 | Shelton et al. | 361/634 |
| 8,193,445 B2 | * | 6/2012 | Li | 174/53 |
| 2003/0032340 A1 | | 2/2003 | Zweigle et al. | |
| 2004/0147148 A1 | | 7/2004 | Ng et al. | |
| 2005/0258922 A1 | | 11/2005 | Rowe et al. | |
| 2007/0049077 A1 | | 3/2007 | Germain | |
| 2007/0137991 A1 | | 6/2007 | Kashyap et al. | |
| 2008/0296039 A1 | * | 12/2008 | Dinh et al. | 174/58 |
| 2008/0303392 A1 | | 12/2008 | Pepe et al. | |
| 2009/0014210 A1 | | 1/2009 | Forbis | |

FOREIGN PATENT DOCUMENTS

| | | |
|---|---|---|
| DE | 3536855 A1 | 4/1987 |
| DE | 102006012056 B3 | 8/2007 |
| EP | 1507054 A1 | 2/2005 |
| EP | 2347954 A1 | 7/2011 |
| GB | 2485398 A | 5/2012 |

OTHER PUBLICATIONS

Chen, M., The Research and Development of Completely-isolated and Plug-in Breaker of the Overhead Line; Dec. 10-13, 2008; Technical Sessions I; CICED 208; pp. 1-4.
Search Report and Written Opinion from EP Application No. 13168649.5 dated Sep. 16, 2013.

* cited by examiner

*Primary Examiner* — Hung Ngo
(74) *Attorney, Agent, or Firm* — General Electric Company

(57) ABSTRACT

An electrical panel including a housing configured to house one or more electrical components that are accessible from outside the housing. A shutter door assembly is coupled to the housing. The shutter door assembly comprises a compartment door and a barrier panel slidably coupled to the compartment door. The barrier panel is configured to be placed in a closed position that obstructs access to the one or more electrical components through the compartment door and an open position that provides access to the one or more electrical components through the compartment door.

19 Claims, 6 Drawing Sheets

SHUTTER DOOR ASSEMBLY FOR AN ELECTRICAL PANEL

BACKGROUND OF THE INVENTION

The field of the invention relates generally to a door assembly for an electrical panel, and more particularly, to shutter door assemblies for electrical panels that allow selective access to electrical connections of the electrical panel.

Electrical panels are typically metallic boxes that house multiple electrical connections, fuses, circuit breakers and other electrical distribution devices. Electrical panels may be commonly referred to as a circuit breaker panel, a breaker panel, a load center, a service panel, a breaker box, an electrical box or the like.

Typically, electrical panels include one or more plug-in type receptacles that allow a user to connect a cable to the receptacle. In known electrical panels, the receptacles are accessible by a hinged solid metal plate door that must be opened to provide access to the receptacles. The metal plate door acts as a protective covering for the receptacles when not in use. When a cable is connected to a receptacle, the door can not be fully closed due to cable entry, which creates a safety hazard. Additionally, when the door remains in a fully or partially open position, animals may enter and cause damage. The panel may also be exposed to potential environmental damage or vandalism damage when the door is fully or partially open.

BRIEF DESCRIPTION OF THE INVENTION

In one aspect, an electrical panel includes a housing configured to house one or more electrical components that are accessible from outside the housing. A shutter door assembly is coupled to the housing. The shutter door assembly comprises a compartment door and a barrier panel slidably coupled to the compartment door. The barrier panel is configured to be placed in a closed position that obstructs access to the one or more electrical components through the compartment door and an open position that provides access to the one or more electrical components through the compartment door.

In another aspect, a shutter door assembly for an electrical panel housing includes a compartment door configured to be coupled to the housing and having at least one opening. The shutter door includes a barrier panel having at least one opening slidably coupled to the compartment door. The barrier panel is configured to be placed in a closed position that blocks the at least one compartment door opening and an open position wherein the at least one barrier panel opening is in alignment with the at least one compartment door opening.

In yet another aspect, a method of assembling an electrical panel includes providing a housing configured to house at least one electrical component. The method further includes coupling a shutter door assembly to the housing. The shutter door assembly has a compartment door having at least one opening and a barrier panel slidably coupled to the compartment door. The barrier panel is configured to be placed in a closed position that obstructs access to the at least one electrical component through the compartment door and an open position that provides access to the at least one electrical component through the compartment door.

DETAILED DESCRIPTION OF THE INVENTION

Figure 1:
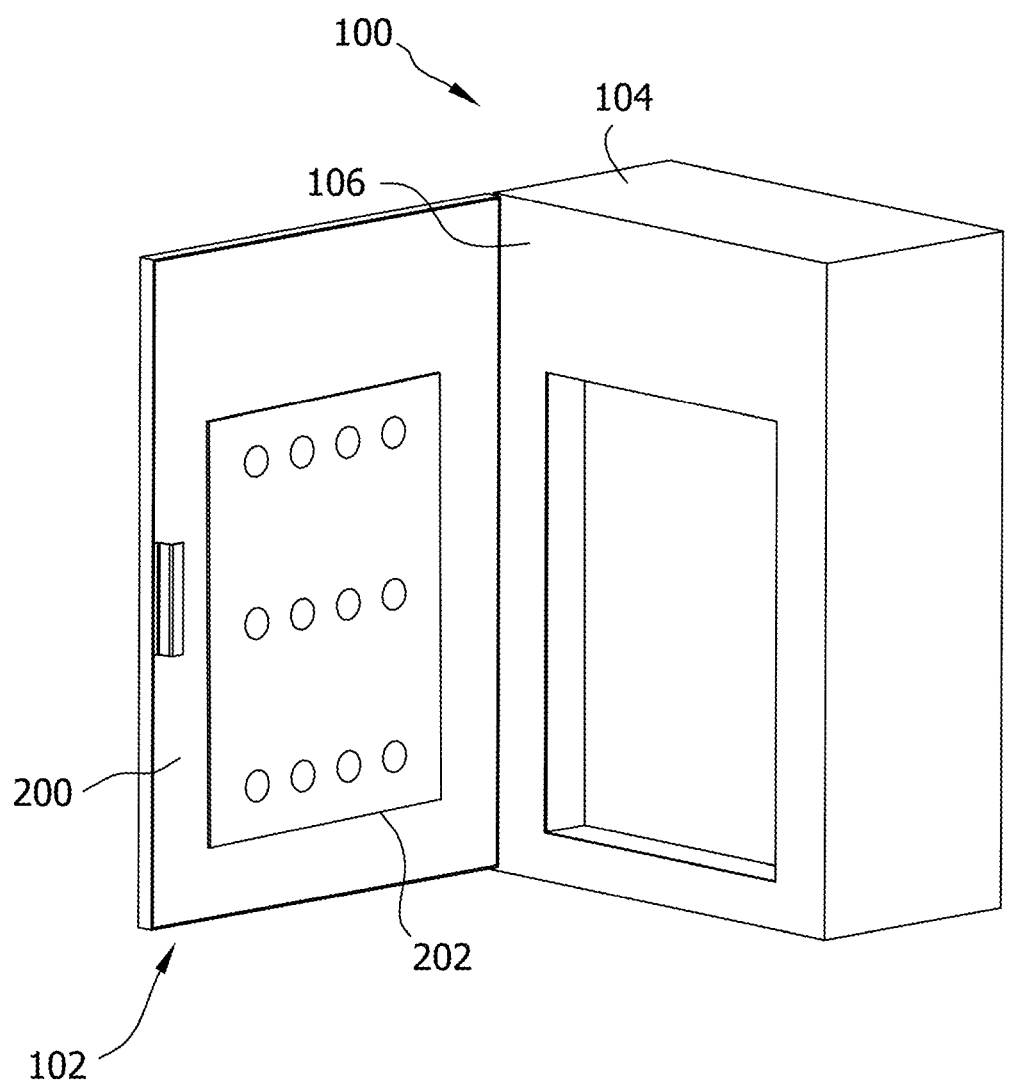
FIG. 1 is a perspective view of an exemplary electrical panel assembly.
Figure 7:
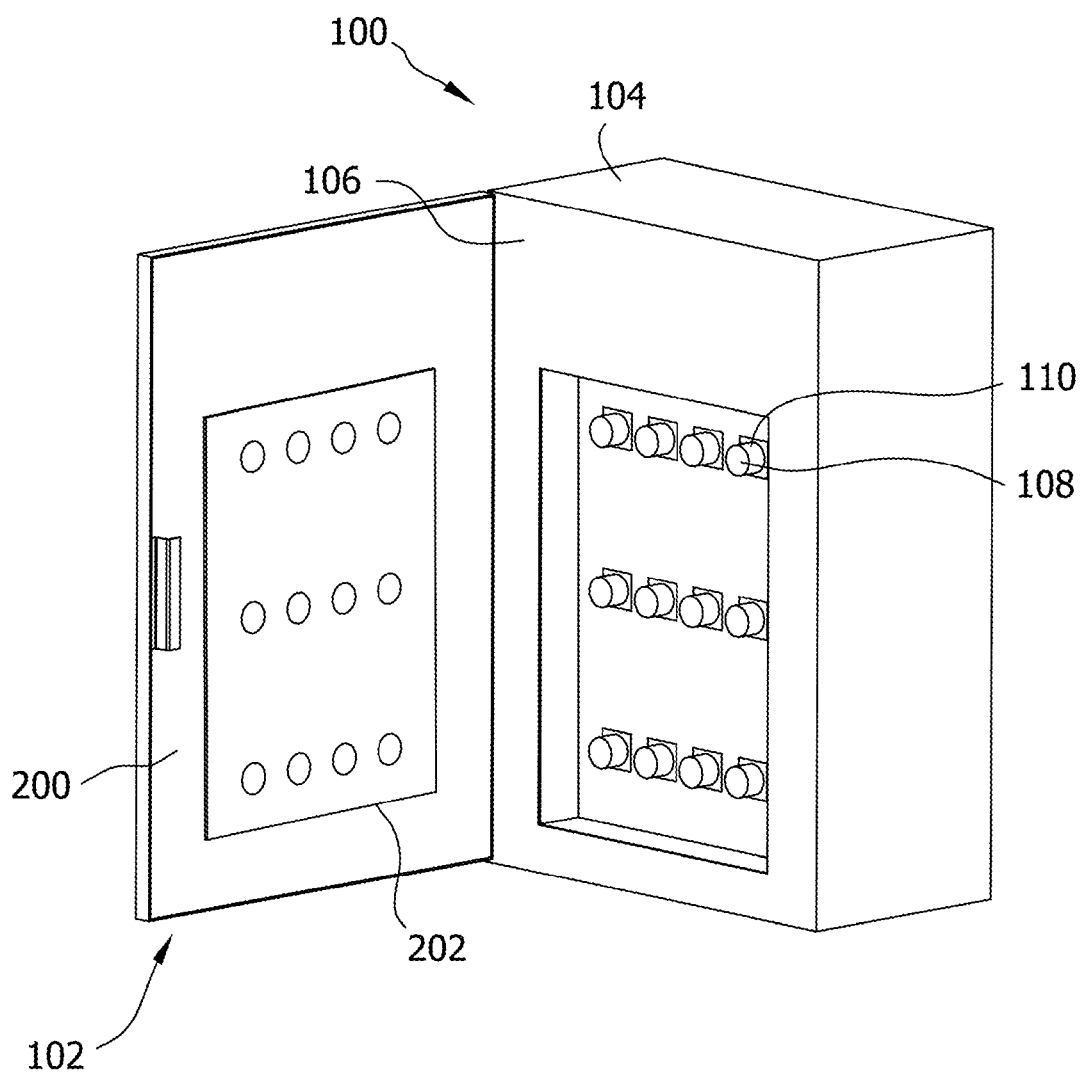
FIG. 7 is a perspective view of an exemplary electrical panel assembly shown in FIG. 1 with connectors and receptacles.

FIGS. 1 and 7 illustrate an electrical panel 100 including a shutter door assembly 102. In one embodiment, electrical panel 100 has a box shaped housing 104 defining a cavity therein for housing electrical components. In one embodiment, a faceplate 106 is attached to a front of electrical panel 100. In one embodiment, electrical panel 100 houses one or more electrical components (not shown) within the cavity of housing 104. One or more of the electrical components are connected to a receptacle 108 (FIG. 7), for example by wiring or electrical cable (not shown). In one embodiment, at least one receptacle 108 has a connector 110 (FIG. 7) accessible from outside housing 104. In another embodiment, at least one of connectors 110 are disposed on an outside surface of faceplate 106. In one embodiment, connectors 110 are electrical connectors, such as quick-connect type electrical connectors. However, connectors 110 may be any type of connectors that allow electrical panel 100 to function as disclosed herein.

Figure 2:
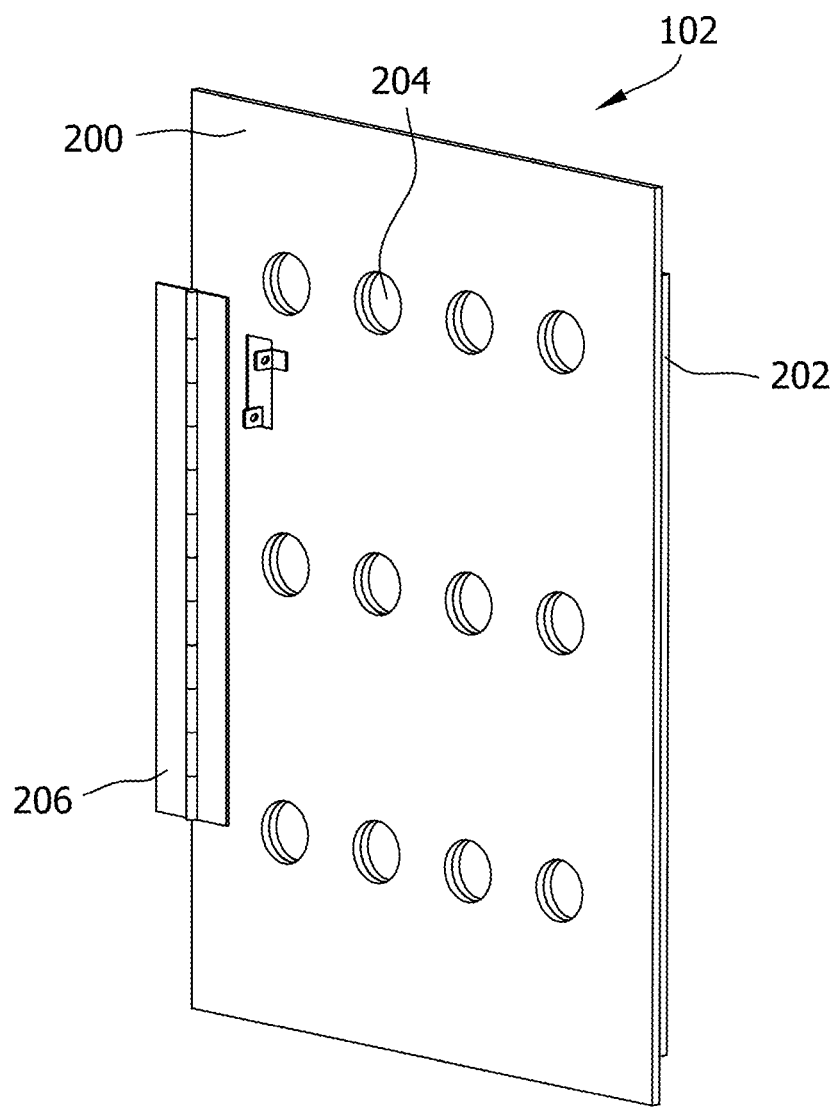
FIG. 2 is a front view of an exemplary shutter door assembly in an open position.

FIG. 2 illustrates an embodiment of shutter door assembly 102. In one embodiment, shutter door assembly 102 includes a compartment door 200 and a barrier panel 202, which is slidably coupled to compartment door 200. In the exemplary embodiment, compartment door 200 includes one or more openings 204 extending therethrough that are aligned with connectors 110 (shown in FIG. 1) when shutter door assembly 102 is coupled to housing 104 (shown in FIG. 1). Openings 204 provide access to connectors 110 from outside housing 104. In one embodiment, openings 204 are circular. However, openings 104 may be any shape that allows access to connectors 110. In other embodiments, openings 204 have a shape that corresponds to a cross-sectional shape of connectors 110, for example, if connectors have a hexagonal cross-sectional shape, openings 204 will also have a hexagonal cross-sectional shape. In yet other embodiments, openings 204 are sized such that when a connecting device (not shown) passes through opening 204 to connect to connector 110, the connecting device substantially fills and/or seals opening 204. Shutter door assembly 102 is coupled to faceplate 106 by a coupler 206 that is attached to compartment door 200 and faceplate 106. Shutter door assembly 102 allows a user to access connectors 110 by sliding barrier panel 202 as described below so that connectors 110 are accessible while compartment door 200 is closed. In one embodiment, coupler 206 is a hinge that allows shutter door assembly 102 to pivot relative to faceplate 106 and provides additional access to connectors 110. In another embodiment, coupler 206 may be another type of fastener that attaches compartment door 200 to faceplate 106.

Figure 3:
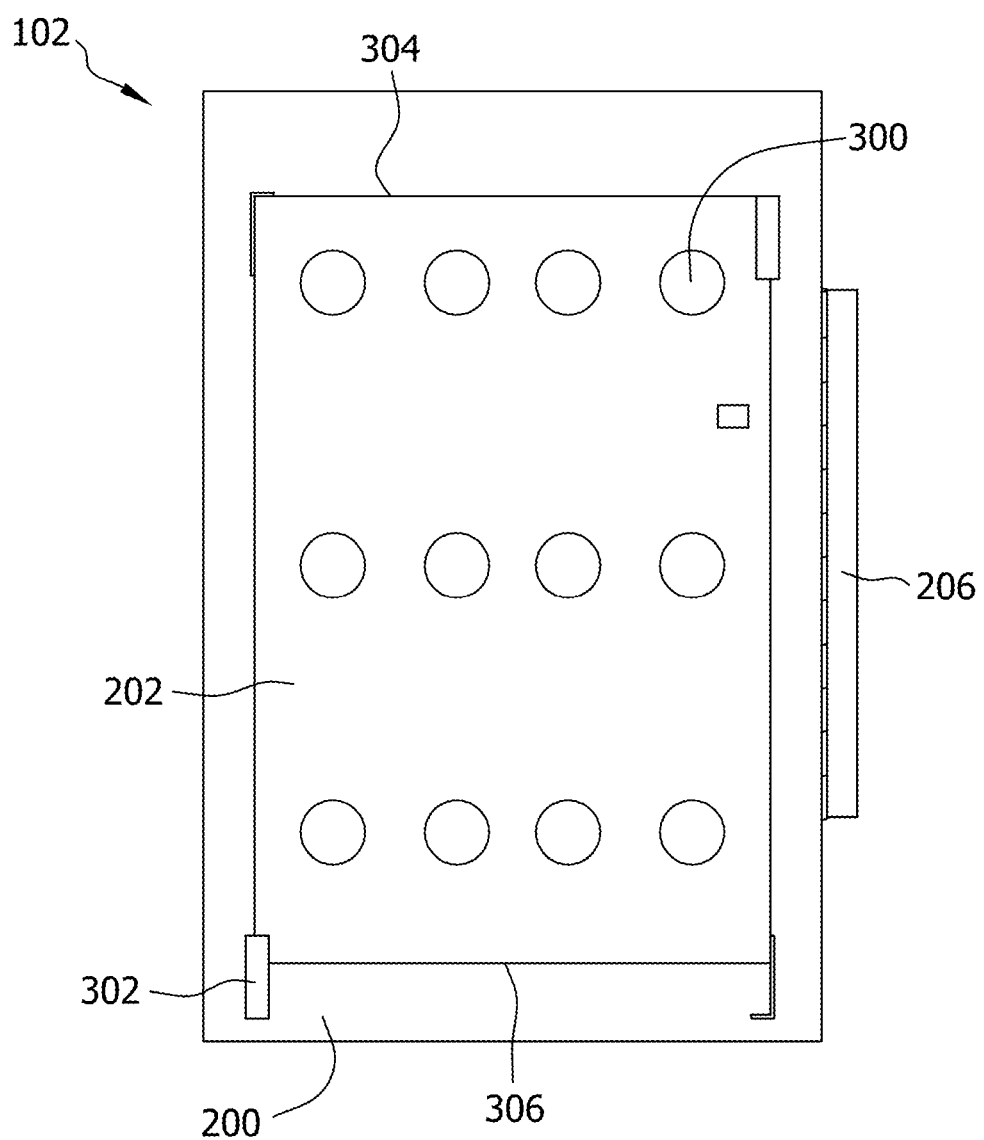
FIG. 3 is a rear view of the shutter door assembly shown in FIG. 2.

FIG. 3 illustrates a rear view of shutter door assembly 100. Barrier panel 202 is slidably coupled to an inner side of compartment door 200 proximal to faceplate 106. In the exemplary embodiment, barrier panel 202 includes a plurality of openings 300 that align with openings 204 of compartment door 200 in at least one position (e.g., an open position). In one embodiment, openings 300 are complimentary with openings 204. In an alternative embodiment, barrier panel 202 is a solid panel having no openings. In one embodiment, barrier panel 202 is slidably coupled to compartment door 200 via guide brackets 302 that are configured to enable barrier panel 202 to move from a closed position (shown in FIGS. 3 and 4) in which barrier panel 202 is positioned such that openings 204 are blocked by solid portions of barrier panel 202, to an open position (shown in FIG. 2) in which at least one opening 204 is not blocked by a solid portion of barrier panel 202. Guide brackets 302 maintain barrier panel 202 in a predetermined alignment with compartment door 200 during sliding. In one embodiment, the open position corresponds to a position of barrier panel 202 relative to compartment door 200 such that openings 300 are aligned with openings 204, for example as shown in FIG. 2. In another embodiment, barrier panel 202 is positioned relative to compartment door 200 such that upper edge 304 is located below at least one opening 204 or lower edge 306 is located above at least one opening 204 to provide access to connectors 110. In another embodiment, when barrier panel 202 is in the closed position, shutter door assembly 100 is substantially or completely water-tight, such that water cannot enter through openings 204 and contact connectors 110.

Figure 4:
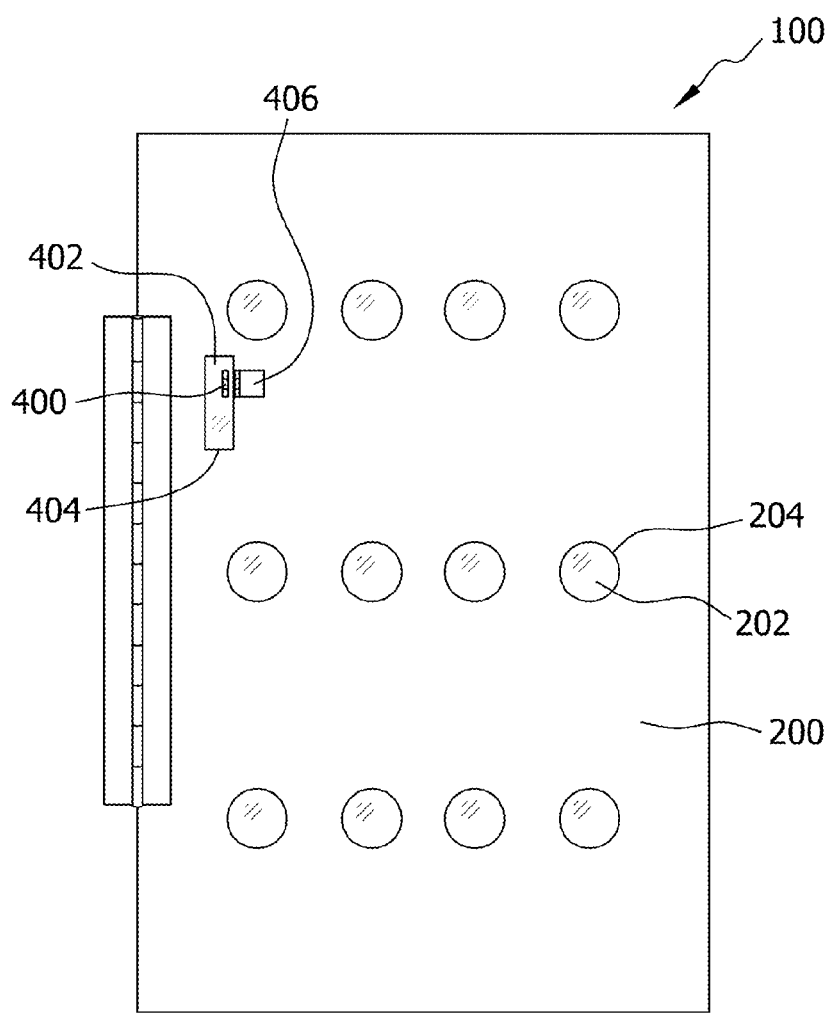
FIG. 4 is a front view of the shutter door assembly of FIG. 2 in a closed position.
Figure 5:
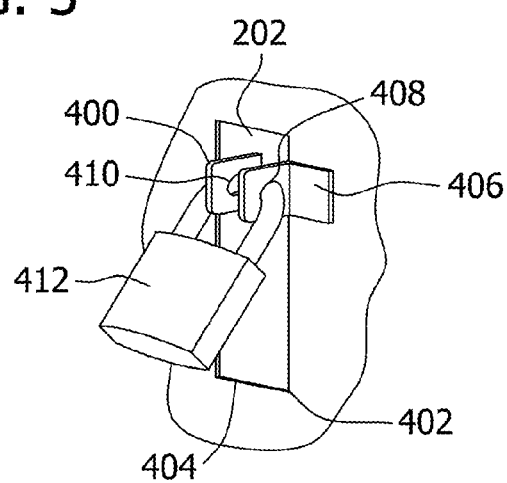
FIG. 5 shows an enlarged view of a locking device of the shutter door assembly shown in FIG. 4.

FIG. 4 illustrates a front view of shutter door assembly 100 in a closed position. In one embodiment, barrier panel 202 includes a protrusion 400 and compartment door 200 includes a slot 402. Protrusion 400 is configured to project outwardly through slot 402, which enables a user to grasp protrusion 400, for example for use as a handle to move barrier panel 202 relative to compartment door 200. In one embodiment, slot 402 is defined by an upper edge, a lower edge and a pair of side edges, and is sized such that protrusion 400 rests on a lower edge 404 when barrier panel 202 is in the open position. In another embodiment, compartment door 200 includes a second protrusion 406 that aligns with protrusion 400 in at least one position. In one embodiment, protrusion 400 includes a lock hole 410 (shown in FIG. 5) and second protrusion 406 includes a second lock hole 408 (shown in FIG. 5). When lock hole 410 and second lock hole 408 are in alignment, for example in the closed position of barrier panel 202, a locking device 412 (shown in FIG. 5) may be inserted therethrough to lock barrier panel 202 in the closed position, and thus prevents access to connectors 110 (shown in FIG. 5).

In some embodiments, barrier panel 202 is made of a plastic material and compartment door 200 is fabricated from a metal material. In other embodiments at least one of barrier panel 202 and compartment door 200 is fabricated from an insulating material. In still other embodiments, barrier panel 202 and compartment door 200 are made of the same material.

Figure 6:
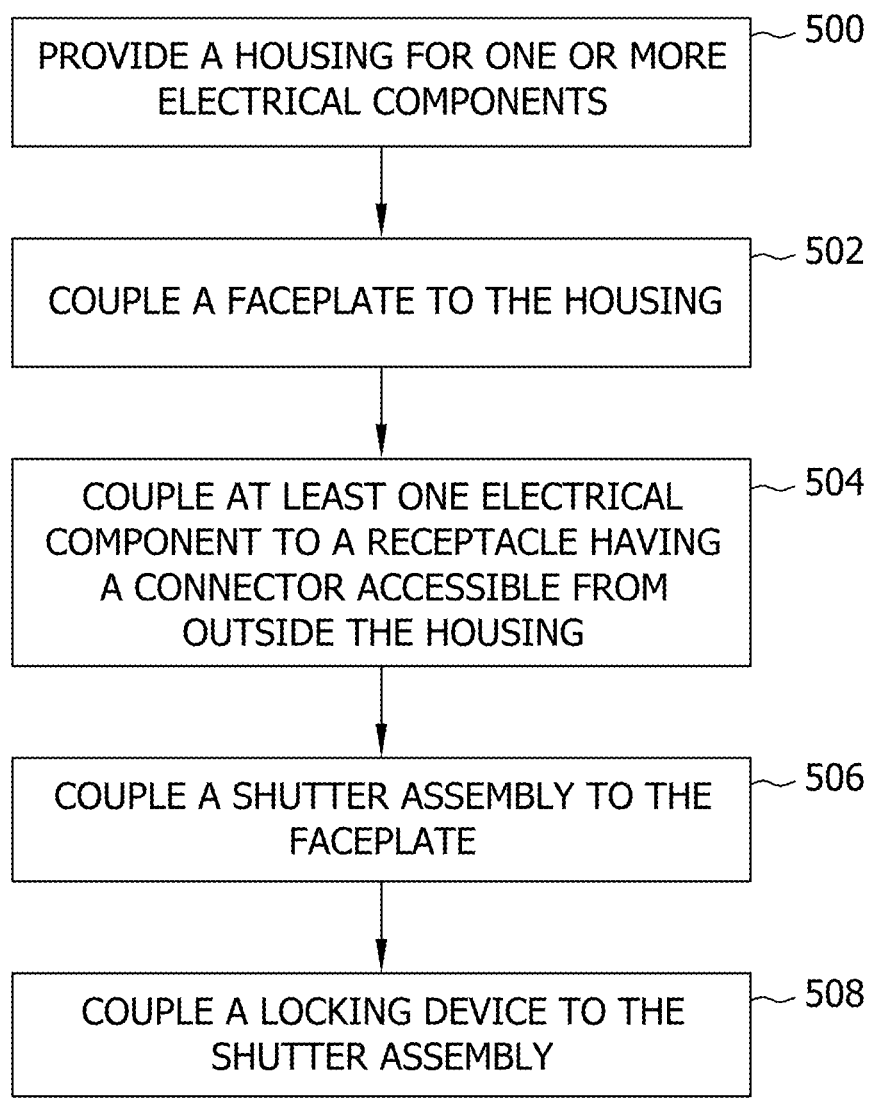
FIG. 6 is a block diagram of an exemplary method of assembling the electrical panel shown in FIG. 1.

FIG. 6 is a flow diagram for a method of assembling an electrical panel 100. The method includes providing 500 a housing 104 for housing one or more electrical components. A faceplate 106 is coupled 502 to housing 104 to define a wall of housing 104. At least one electrical component is coupled 504 to a receptacle 108 having a connector 110 on the outside surface of faceplate 106. A shutter door assembly 102 is coupled 506 to faceplate 106. Shutter door assembly 102 is configured to be placed in a closed position that obstructs access to connector 110 and an open position that does not obstruct access to connector 110. In another embodiment, a locking device 412 is coupled 508 to shutter door assembly 102.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electrical panel comprising:
a housing configured to house one or more electrical components that are accessible from outside the housing, and
a shutter door assembly coupled to said housing, said shutter door assembly comprising a compartment door and a substantially planar barrier panel slidably coupled to said compartment door, said barrier panel configured to be placed in a closed position that obstructs access to the one or more electrical components through said compartment door and an open position that provides access to the one or more electrical components through said compartment door, said compartment door comprising a first protrusion and a slot elongated in a sliding direction of said barrier panel, said barrier panel comprising a second protrusion that projects outwardly through the slot, wherein said first protrusion aligns with said second protrusion in at least one of the closed position and the open position.

2. The electrical panel according to claim 1, wherein said compartment door comprises at least one opening configured to be blocked by said barrier panel when said barrier panel is in the closed position.

3. The electrical panel according to claim 2, wherein said barrier panel is configured to slide relative to said compartment door between the closed position and the open position.

4. The electrical panel according to claim 1, wherein said barrier panel comprises at least one opening and said compartment door comprises at least one opening, said at least one barrier panel opening configured to align with said at least one compartment door opening and the at least one electrical component in the open position, said barrier panel configured to slide relative to said compartment door between the closed position and the open position, said electrical panel further comprises one or more guide brackets coupled to said compartment door and said barrier panel, wherein said guide brackets are configured to maintain alignment of said barrier panel with respect to said compartment door.

5. The electrical panel according to claim 1, wherein said first protrusion and said second protrusion are configured to enable a locking device to lock said first protrusion to said second protrusion.

6. The electrical panel according to claim 1, wherein at least one of the electrical components is configured to be coupled to a receptacle having a connector accessible from outside the housing.

7. The electrical panel according to claim 1, wherein said compartment door is fabricated from a first material, and said barrier panel is fabricated from a second material that is different from the first material.

8. The electrical panel according to claim 1, wherein said housing further comprises a faceplate and said compartment door is hingedly attached to said faceplate.

9. The electrical panel according to claim 1, wherein said housing further comprises a faceplate and at least one of said faceplate and said shutter door assembly comprises an insulating material.

10. A shutter door assembly for an electrical panel housing, said shutter door assembly comprising:
   a compartment door configured to be coupled to the housing and having at least one opening; and
   a substantially planar barrier panel having at least one opening and slidably coupled to said compartment door, said barrier panel configured to be placed in a closed position that blocks the at least one compartment door opening and an open position wherein the at least one barrier panel opening is in alignment with the at least one compartment door opening, said compartment door comprising a first protrusion and a slot elongated in a sliding direction of said barrier panel, said barrier panel comprising a second protrusion that projects outwardly through the slot, wherein said first protrusion aligns with said second protrusion in at least one of the closed position and the open position.

11. The shutter door assembly according to claim 10, further comprising at least one guide bracket coupled to said compartment door and said barrier panel, said at least one guide bracket configured to maintain alignment of said barrier panel with respect to said compartment door.

12. The shutter door assembly according to claim 10, wherein said barrier panel is configured to slide relative to said compartment door between the closed position and the open position.

13. The shutter door assembly according to claim 12, wherein said at least one barrier panel opening is configured to align with at least one electrical component housed in said housing when said barrier panel is in the open position.

14. The shutter door assembly according to claim 13, further comprising a locking device configured to lock said first protrusion to said second protrusion.

15. The shutter door assembly according to claim 10, wherein said compartment door is hingedly attached to said housing.

16. A method of assembling an electrical panel comprising:
   providing a housing configured to house at least one electrical component; and
   coupling a shutter door assembly to the housing, the shutter door assembly having a compartment door having at least one opening and a substantially planar barrier panel slidably coupled to the compartment door, the barrier panel configured to be placed in a closed position that obstructs access to the at least one electrical component through the compartment door and an open position that provides access to the at least one electrical component through the compartment door, the compartment door including a first protrusion and a slot elongated in a sliding direction of the barrier panel, the barrier panel including a second protrusion that projects outwardly through the slot, wherein coupling the shutter door assembly to the housing comprises slidably coupling the barrier panel to the compartment door such that the first protrusion aligns with the second protrusion in at least one of the closed position and the open position.

17. The method according to claim 16, the barrier panel having at least one opening, wherein coupling the shutter door assembly to the housing comprises hingedly coupling the compartment door to the housing and slidably coupling the barrier panel to the compartment door such that at the least one barrier panel opening is configured to align with at the least one compartment door opening in the open position and the barrier panel is configured to slide relative to the compartment door between the closed position and the open position.

18. The method according to claim 17, further comprising coupling a locking device to the shutter door assembly.

19. The method according to claim 16, further comprising hingedly coupling the compartment door to the housing.

\* \* \* \* \*

UNITED STATES PATENT AND TRADEMARK OFFICE
CERTIFICATE OF CORRECTION

PATENT NO.         : 8,791,362 B2
APPLICATION NO.    : 13/479699
DATED              : July 29, 2014
INVENTOR(S)        : Kumar It is certified that error appears in the above-identified patent and that said Letters Patent is hereby corrected as shown below:

In the Specification

In Column 2, Line 45, delete "openings 104" and insert -- openings 204 --, therefor.

In Column 2, Line 65, delete "shutter door assembly 100." and insert -- shutter door assembly 102. --, therefor.

In Column 3, Line 25, delete "shutter door assembly 100" and insert -- shutter door assembly 102 --, therefor.

In Column 3, Line 28, delete "shutter door assembly 100" and insert -- shutter door assembly 102 --, therefor.

In the Claims

In Column 6, Line 28, in Claim 17, delete "at the least" and insert -- the at least --, therefor.

In Column 6, Lines 29-30, in Claim 17, delete "at the least" and insert -- the at least --, therefor.

Signed and Sealed this
Twelfth Day of May, 2015

Michelle K. Lee
*Director of the United States Patent and Trademark Office*